United States Patent
Liu et al.

(10) Patent No.: US 9,774,515 B2
(45) Date of Patent: Sep. 26, 2017

(54) ROUTER AND RESOURCE ASSIGNMENT METHOD THEREOF

(71) Applicant: Wistron NeWeb Corp., Hsinchu (TW)

(72) Inventors: I-Hsun Liu, Hsinchu (TW); Chien-I Cho, Hsinchu (TW); Yi-Ting Ting, Hsinchu (TW); Jia-Jiuan Wu, Hsinchu (TW); Jia-Ao Yang, Hsinchu (TW)

(73) Assignee: Wistron Neweb Corp., Hsinchu (TW)

( * ) Notice: Subject to any disclaimer, the term of this patent is extended or adjusted under 35 U.S.C. 154(b) by 69 days.

(21) Appl. No.: 14/804,972

(22) Filed: Jul. 21, 2015

(65) Prior Publication Data
US 2016/0029284 A1    Jan. 28, 2016

(30) Foreign Application Priority Data

Jul. 25, 2014  (TW) .............................. 103125462 A

(51) Int. Cl.
| | |
|---|---|
| *H04L 12/28* | (2006.01) |
| *H04L 12/26* | (2006.01) |
| *H04W 76/02* | (2009.01) |
| *H04L 12/24* | (2006.01) |
| *H04W 84/12* | (2009.01) |

(52) U.S. Cl.
CPC ...... *H04L 43/0894* (2013.01); *H04L 41/0896* (2013.01); *H04L 41/5045* (2013.01); *H04W 76/026* (2013.01); *H04W 84/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,167,444 A | * | 12/2000 | Boden ................ | H04L 12/4604 709/223 |
| 6,243,379 B1 | * | 6/2001 | Veerina .................. | H04L 12/46 370/389 |
| 7,145,881 B1 | * | 12/2006 | Dawes ................ | H04L 12/4604 370/253 |
| 8,356,346 B2 | * | 1/2013 | Datta .................. | H04L 63/0428 726/15 |
| 8,724,604 B2 | * | 5/2014 | Yang ...................... | H04L 45/60 370/338 |
| 8,780,811 B1 | * | 7/2014 | Datta .................. | H04L 41/0659 370/310.2 |

(Continued)

FOREIGN PATENT DOCUMENTS

TW           201110619 A      3/2011

*Primary Examiner* — Frank Duong
(74) *Attorney, Agent, or Firm* — Muncy, Geissler, Olds & Lowe, P.C.

(57) ABSTRACT

The present invention provides a router including first and second wide-area network interfaces, at least one local area network interface, and a control unit. The local area network interface is electrically connected to at least one electronic device through at least one local area network. The control unit enables the electronic device to have at least one network service of the Internet through the first and the second wide-area network interfaces and the local area network interface, and assigns the network service to the first wide-area network interface or the second wide-area network interface according to at least one condition of the network service, wherein the condition includes at least one packet rate caused by the network service.

16 Claims, 6 Drawing Sheets

(56) References Cited

U.S. PATENT DOCUMENTS

| | | | |
|---|---|---|---|
| 8,804,696 B1* | 8/2014 | Krishnamurthy | H04W 88/06 370/352 |
| 2009/0041041 A1* | 2/2009 | True | H04B 7/18506 370/401 |
| 2009/0234934 A1* | 9/2009 | Ong | H04L 12/2878 709/217 |
| 2012/0134257 A1* | 5/2012 | Knox | H04W 28/08 370/218 |
| 2012/0155450 A1* | 6/2012 | Moeller | H04L 43/0811 370/338 |

* cited by examiner

ROUTER AND RESOURCE ASSIGNMENT METHOD THEREOF

CROSS REFERENCE TO RELATED APPLICATIONS

This Application claims priority of Taiwan Patent Application No. 103125462, filed on Jul. 25, 2014, the entirety of which is incorporated by reference herein.

BACKGROUND OF THE INVENTION

Field of the Invention

The present invention relates to a router, and in particular to a router with a plurality of wide-area network interface.

Description of the Related Art

Presently, mobile devices are highly developed and multifunctional. For example, handheld devices such as mobile phones and tablets are capable of conducting telecommunications, receiving and transmitting e-mails, maintaining social networks, managing contacts, and playing media. Hence, users can implement various applications on their mobile devices, such as a simple phone call, social network interaction, or commercial transaction.

Most current handheld devices include a communication module arranged to perform a wireless or wired communication. Therefore, usage of routers is becoming more frequent. However, making the router to work in the better performance becomes an important issue.

BRIEF SUMMARY OF THE INVENTION

A detailed description is given in the following embodiments with reference to the accompanying drawings.

An exemplary embodiment provides a router. The router includes a first wide-area network interface, a second wide-area network interface, at least one local area network interface, and a control unit. The first wide-area network interface is arranged to connect to a first wide-area network, and connect to the Internet through the first wide-area network. The second wide-area network interface is arranged to connect to a second wide-area network, and connect to the Internet through the second wide-area network. The local area network interface is arranged to be electrically connected to at least one electronic device through at least one local area network. The control unit is arranged to enable the electronic device to have at least one network service of the Internet through the first wide-area network interface, the second wide-area network interface and the local area network interface, and assign the network service to the first wide-area network interface or the second wide-area network interface according to at least one condition of the network service, wherein the condition includes at least one packet rate caused by the network service.

Another exemplary embodiment provides a resource assignment method. The resource assignment method is applied to an electronic device which is arranged to be electrically connected to a router. The resource assignment method includes: determining whether a first wide-area network interface is connected to a first wide-area network and a second wide-area network interface is connected to a first wide-area network; enabling the electronic device to have at least one network service of the Internet through the first wide-area network interface, the second wide-area network interface and a local area network interface when the first wide-area network interface is connected to the first wide-area network and the second wide-area network interface is connected to the second wide-area network, wherein the local area network interface is arranged to be electrically connected to the electronic device; and assigning the network service to the first wide-area network interface or the second wide-area network interface according to at least one condition of the network service, wherein the condition includes at least one packet rate caused by the network service.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
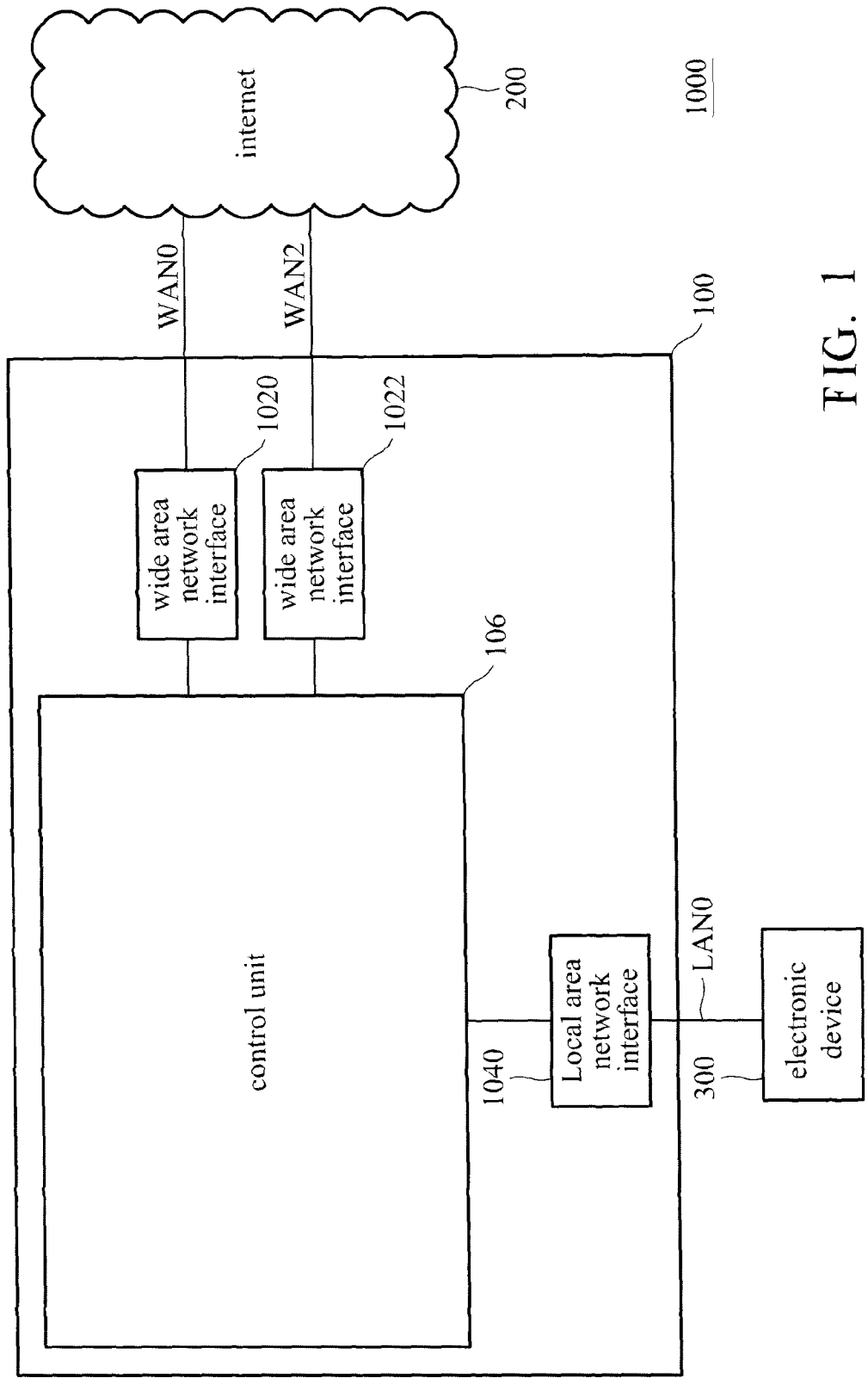
FIG. 1 is a schematic diagram illustrating an embodiment of the routing system of the present disclosure.

FIG. 1 is a schematic diagram illustrating an embodiment of routing system of the present disclosure. In this embodiment, the routing system 1000 includes a router 100, the Internet 200 and an electronic device 300. The router 100 is arranged to electrically connect the electronic device 300 to the Internet 200, wherein the electronic device 300 is a wired network device or a wireless network device, but it is not limited thereto. In one embodiment, the router 100 is arranged to provide a routing mechanism for the electronic device 300, wherein the routing mechanism is arranged to determine the routing path of network packets. Moreover, the router 100 is arranged to provide a transfer mechanism for the electronic device 300, wherein the transfer mechanism is arranged to transmit the network packet of the input terminal of the router to the output terminal of the router. As shown in FIG. 1, the router 100 includes a wide-area network interface 1020, a wide-area network interface 1022, a local area network interface 1040 and a control unit 106.

The wide-area network interface 1020 is arranged to connect to a wide-area network WAN0 (Wide-area network; WAN), and connect to the Internet 200 through the wide-area network WAN0. It should be noted that the Internet 200 is a global system of interconnected computer networks that use the standard Internet protocol suite (TCP/IP) to link several billion devices worldwide.

Similarly, the wide-area network interface 1022 is arranged to connect to a wide-area network WAN2, and connect to the Internet 200 through the wide-area network WAN2.

The local area network interface 1040 is arranged to connect the electronic device 300 through a local area network LAN0 (Local Area Network; LAN).

The control unit 106 includes a central-processing unit (CPU) or a plurality of processing units in a parallel processing environment. Moreover, the control unit 106 may include a read only memory (ROM), a flash ROM and/or random access memory (RAM) arranged to store the program arranged to be performed by the control unit 106. In one embodiment, the control unit 106 is arranged to enable the electronic device 300 to have a plurality of different network services of the Internet 200 through the wide-area network interface 1020, the wide-area network interface 1022 and the local area network interface 1040. For example, the network services provide web pages, file downloads, etc., but it is not limited thereto. Moreover, the control unit 106 is further arranged to assign the network services to the wide-area network interface 1020 or the wide-area network interface 1022 according to at least one condition of the corresponding network services. Namely, the data transmissions of the network services with different conditions are transmitted by different wide-area network interfaces. It should be noted that the memory (not shown) of the control unit 106 may include a setting table arranged to store the rules of the packet transmission. The control unit 106 may update the setting table according to the priorities of the network services or the packet rates caused by the network services to assign the network services according to the setting table. Moreover, the control unit 106 further includes a service dispatcher engine. The service dispatcher engine is arranged to assign the packets of the different network services, such that the packets of the different network services can be transmitted by different wide-area network interfaces.

In one embodiment, the condition of the network service is the packet rate caused by the network service, but it is not limited thereto. In another embodiment, the condition of the network service further includes the required quality level of the network service, the required time of the network services, and/or the run time of the network services, but it is not limited thereto. It should be noted that the run time is the elapsed time since the network service began. For example, the control unit 106 may further arranged to determine a plurality of service types of the network services according to a plurality of headers produced by the network services. For example, the types of the network services may include web-page browsing, point to point download, multi-point to multi-point download, video stream download, voice stream download, etc., but it is not limited thereto. After determining the service type of the network services, the control unit 106 collects the conditions of the network services to calculate a plurality of weightings of the corresponding network services, and compares the weightings to determine a plurality of priorities of the corresponding network services. For example, the control unit 106 is arranged to determine the packet rates, the required times and/or the run times of the network services according to the packets caused by the network services, and is further arranged to determine the required quality levels of the network services according to the service types of the network services. Next, the control unit 106 assigns each of the network services to the wide-area network interface 1020 or wide-area network interface 1022 according to the priority of the network service. In one embodiment, the transmission efficiency of the wide-area network WAN0 is higher than the wide-area network WAN2, wherein the wide-area network WAN0 may be capable of the fourth generation of mobile telecommunications technology (4G), and the wide-area network WAN2 may be capable of the third generation of mobile telecommunications technology (3G), but it is not limited thereto. Namely, the wide-area network WAN0 and the wide-area network WAN2 can be networks having different bandwidths, different frequency bands and/or different transmission speeds. Therefore, the control unit 106 is arranged to assign at least one of the network services with higher priority than the priorities of the other network service to the wide-area network interface 1020. It should be noted that higher packet rates, higher required levels, higher required quality levels, longer required times and longer run times correspond to higher priorities, but it is not limited thereto.

Figure 2:
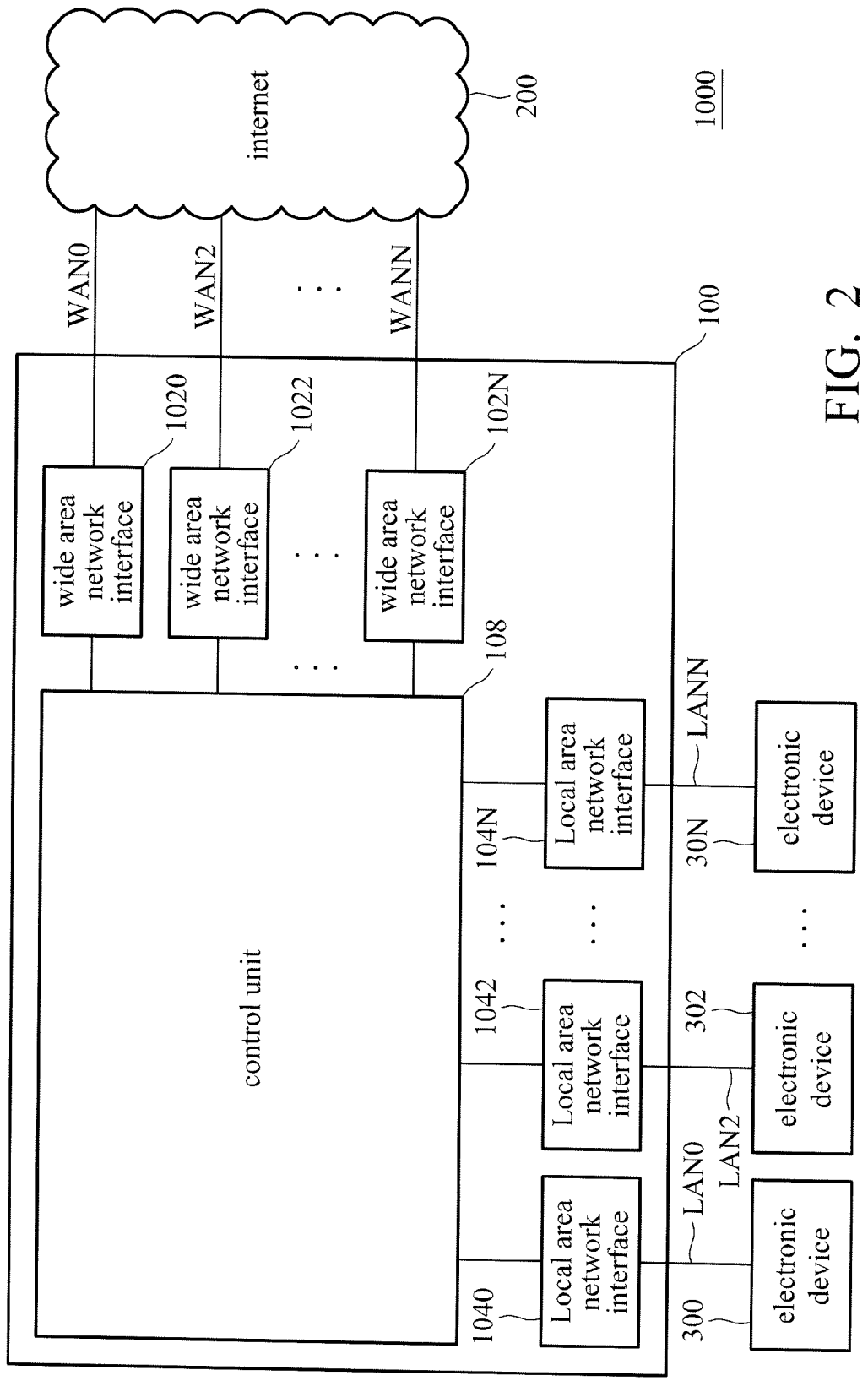
FIG. 2 is a schematic diagram illustrating another embodiment of the routing system of the present disclosure.

FIG. 2 is a schematic diagram illustrating another embodiment of the routing system of the present disclosure. The routing system 1000 of FIG. 2 is similar to the routing system 1000 of FIG. 1 except that the router 100 of FIG. 2 includes a plurality of wide-area network interfaces 1020~102N and a plurality of local area network interfaces 1040~104N, wherein the wide-area network interfaces 1020~102N are arranged to be connected to the Internet 200 through the wide-area networks WAN0~WANN, and the local area network interfaces 1040~104N are arranged to be connected to a plurality of electronic devices 300~30N through the local area networks LAN0~LANK. Namely, the control unit 106 is arranged to enable the electronic devices 300~300N to have the network services of the Internet 200 through the wide-area network interfaces 1020~102N. Moreover, in this embodiment, the control unit 106 is further arranged to analysis the network services performed on each of the electronic devices 300~300N to collect the conditions of the network services for assigning the network services to the suitable wide-area network interfaces 1020~102N.

Figure 3:
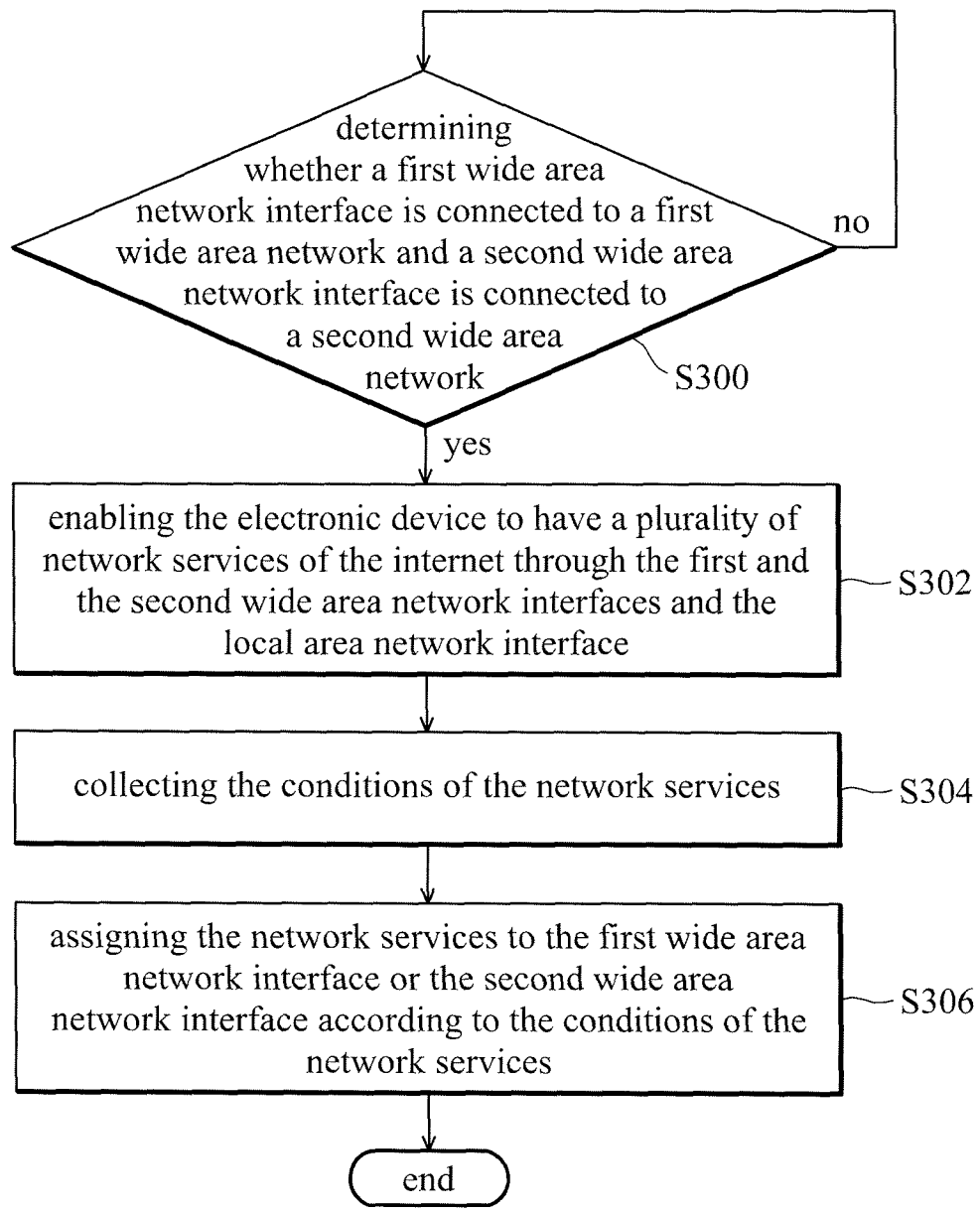
FIG. 3 is a flowchart of a resource assignment method according to an embodiment of the present disclosure.

FIG. 3 is a flowchart of a resource assignment method according to an embodiment of the present disclosure. The resource assignment method is applied to the router 100 of FIG. 1. The process starts at step S300.

In step S300, the router 100 determines whether the wide-area network interface 1020 is connected to the wide-area network WAN0 and the wide-area network interface 1022 is connected to the wide-area network WAN2. When the wide-area network interface 1020 is connected to the wide-area network WAN0 and the wide-area network interface 1022 is connected to the wide-area network WAN2, the process goes to step S302, otherwise, the router 100 continues to determine whether the wide-area network interface 1020 is connected to the wide-area network WAN0 and the wide-area network interface 1022 is connected to the wide-area network WAN2.

In step S302, the control unit 106 enables the electronic device 300 to have a plurality of network services of the Internet 200 through the wide-area network interface 1020, the wide-area network interface 1022 and the local area network interface 1040. For example, the network services provide web pages and file downloads, etc., but it is not limited thereto.

Next, in step S304, the control unit 106 collects the conditions of the corresponding network services. It should be noted that, in this embodiment, the conditions of the network services can include the packet rates caused by the corresponding network services.

Next, in step S306, the control unit 106 assigns the network services to the wide-area network interface 1020 or the wide-area network interface 1022 according to the conditions of the corresponding network services and the transmission efficiency of the wide-area network. The process ends at step S306.

Figure 4:
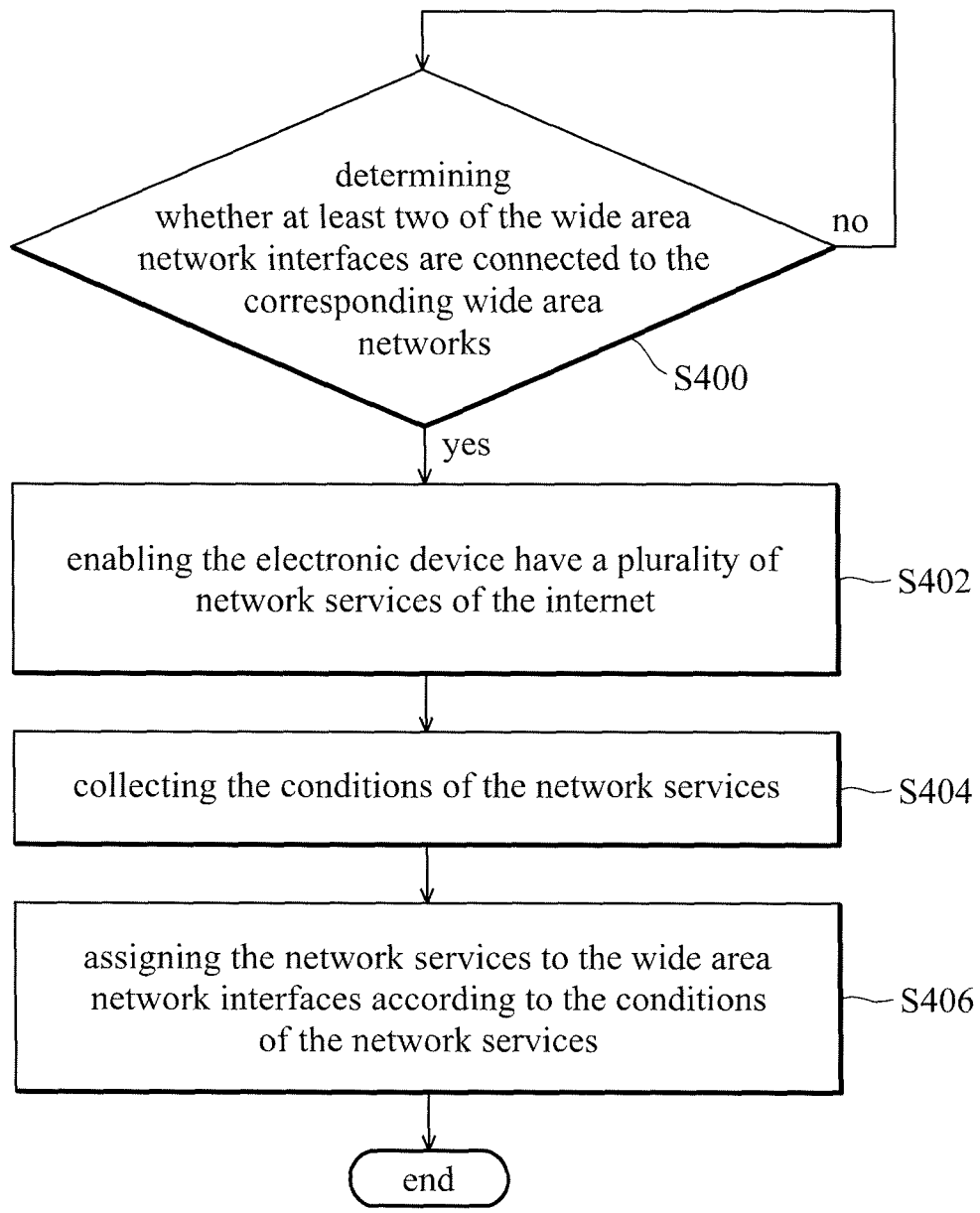
FIG. 4 is a flowchart of a resource assignment method according to another embodiment of the present disclosure.

FIG. 4 is a flowchart of a resource assignment method according to another embodiment of the present disclosure. The resource assignment method is applied to the router 100 of FIG. 2. The process starts at step S400.

In step S400, the router 100 determines whether at least two of the wide-area network interfaces 1020~102N are connected to the corresponding wide-area networks WAN0~WANN. When the two or more wide-area network interfaces 1020~102N are connected to the corresponding wide-area networks WAN0~WANN, the process goes to step S402, otherwise, the router 100 continues to determine whether at least two of the wide-area network interfaces 1020~102N are connected to the corresponding wide-area networks WAN0~WANN.

In step S402, the control unit 106 enables the electronic devices 300~30N to have a plurality of network services of the Internet 200 through the wide-area network interfaces connected to the wide-area networks and the local area network interface 1040. For example, the network services provide web pages and file downloads, etc., but it is not limited thereto.

Next, in step S404, the control unit 106 collects the conditions of the network services. It should be noted that, in this embodiment, the conditions of the network services can include the packet rates caused by the corresponding network services.

Next, in step S406, the control unit 106 assigns the network services to the wide-area network interface 1020 or the wide-area network interface 1022 according to the conditions of the corresponding network services and the transmission efficiency of the wide-area network. The process ends at step S406.

Figure 5:
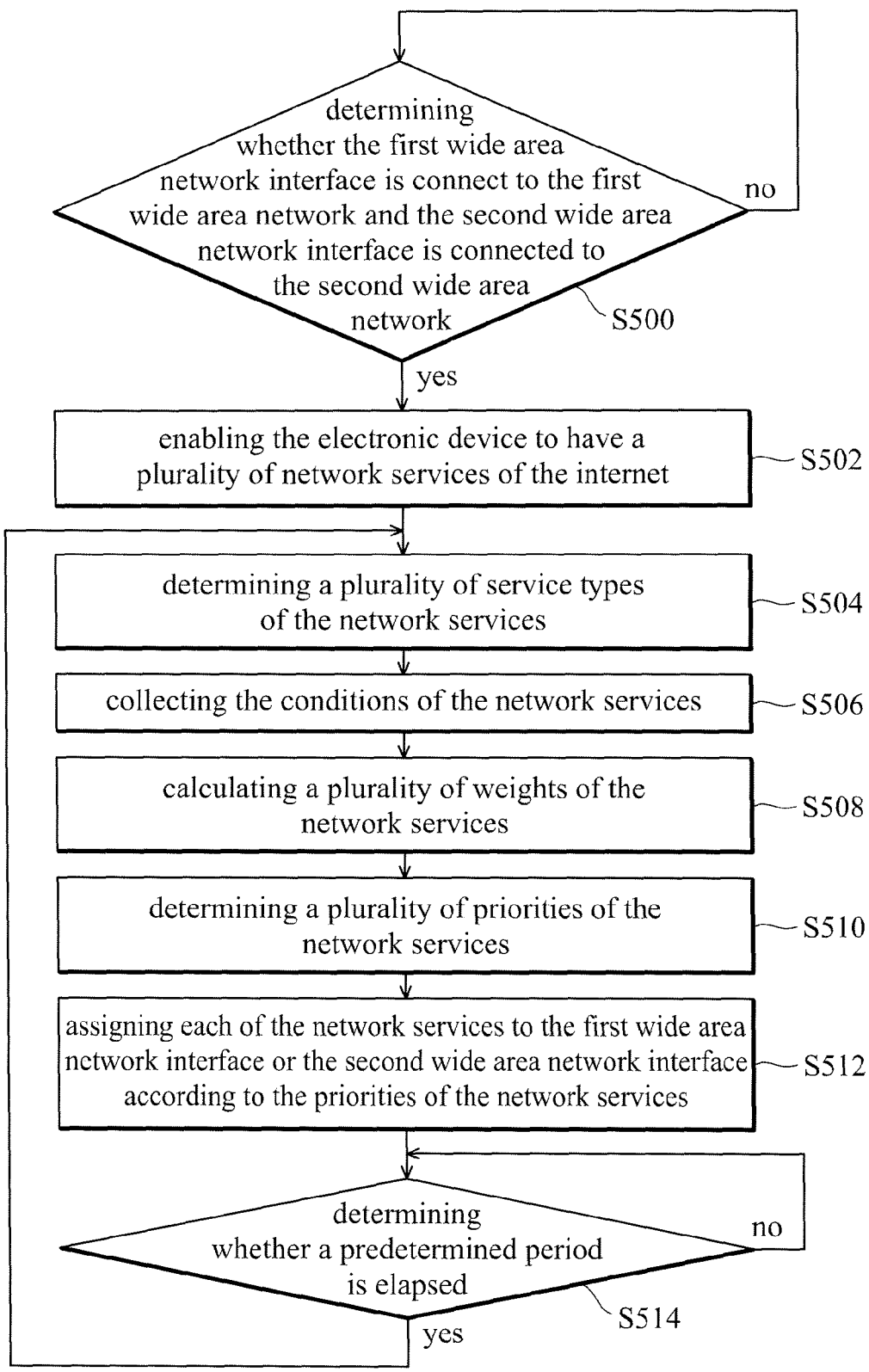
FIG. 5 is a flowchart of a resource assignment method according to another embodiment of the present disclosure.

FIG. 5 is a flowchart of a resource assignment method according to another embodiment of the present disclosure. The resource assignment method is applied to the router 100 of FIG. 1. The process starts at step S500.

In step S500, the router 100 determines whether the wide-area network interface 1020 is connected to the wide-area network WAN0 and the wide-area network interface 1022 is connected to the wide-area network WAN2. When the wide-area network interface 1020 is connected to the wide-area network WAN0 and the wide-area network interface 1022 is connected to the wide-area network WAN2, the process goes to step S502, otherwise, the router 100 continues to determine whether the wide-area network interface 1020 is connected to the wide-area network WAN0 and the wide-area network interface 1022 is connected to the wide-area network WAN2.

In step S502, the control unit 106 enables the electronic devices 300~30N to have a plurality of network services of the Internet 200 through the wide-area network interface 1020, the wide-area network interface 1022 and the local area network interface 1040. For example, the network services provide web pages and file downloads, etc., but it is not limited thereto.

Next, in step S504, the control unit 106 determines a plurality of service types of the network services according to a plurality of headers produced by the network services. For example, the types of the network services may include web-page browsing, point to point download, multi-point download, video stream download or voice stream download, etc., but it is not limited thereto.

Next, in step S506, the control unit 106 collects conditions of the network services. It should be noted that, in this embodiment, the condition of the network service includes the packet rates caused by the corresponding network services, the quality required level of the network service, the required time of the network services and/or the run time of the network service, etc., but it is not limited thereto. For example, the control unit 106 is arranged to determine the packet rates, the required times and/or the run times of the network services according to the packets caused by the network services, and is further arranged to determine the required quality levels of the network services according to the service types of the network services, but it is not limited thereto.

Next, in step S508, the control unit 106 is arranged to calculate a plurality of weightings of the corresponding network services according to the collected conditions of the corresponding network services.

Next, in step S510, the control unit 106 determines a plurality of priorities of the corresponding network services according to the weightings of the determined priorities of the corresponding network services.

Next, in step S512, the control unit 106 assigns each of the network services to the wide-area network interface 1020 or wide-area network interface 1022 according to the priorities of the corresponding network services. In one embodiment, the transmission efficiency of the wide-area network WAN0 is higher than the wide-area network WAN2, wherein the wide-area network WAN0 may be capable of the fourth generation of mobile telecommunications technology (4G), and the wide-area network WAN2 may be capable of the third generation of mobile telecommunications technology (3G), but it is not limited thereto. Therefore, the control unit 106 assigns at least one of the network services with higher priority than the priorities of the other network services to the wide-area network interface 1020. It should be noted that the higher packet rates, the higher required levels, the higher required quality levels, the longer required times and the longer run times correspond to the higher priorities and the higher weights, but it is not limited thereto.

Next, in step S514, the control unit 106 determines whether a predetermined period has elapsed. When the predetermined period has elapsed, the process goes to step S504, the control unit 106 determines the service types of the network services again according to the headers produced by the current network services to dynamically adjust the assignment of the network services.

Figure 6:
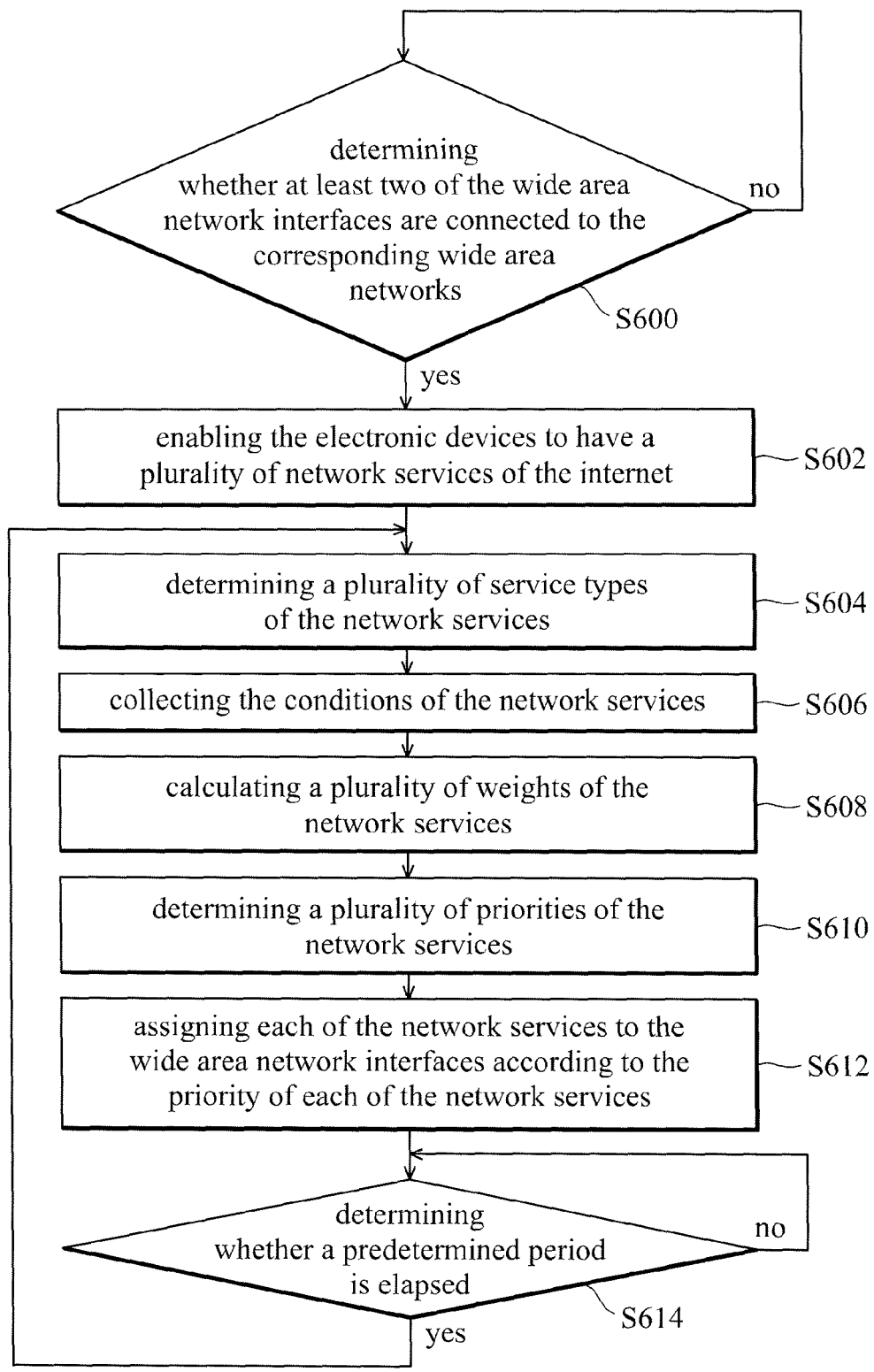
FIG. 6 is a flowchart of a resource assignment method according to another embodiment of the present disclosure.

FIG. 6 is a flowchart of a resource assignment method according to another embodiment of the present disclosure. The resource assignment method is applied to the router 100 of FIG. 2. The process starts at step S600.

In step S600, the router 100 determines whether at least two of the wide-area network interfaces 1020~102N are connected to the corresponding wide-area networks WAN0~WANN. When the two or more wide-area network interfaces 1020~102N are connected to the corresponding wide-area networks WAN0~WANN, the process goes to step S602, otherwise, the router 100 continues to determine whether at least two of the wide-area network interfaces 1020~102N are connected to the corresponding wide-area networks WAN0~WANN.

In step S602, the control unit 106 enables the electronic devices 300~300N to have a plurality of network services of the Internet 200 through the wide-area network interfaces connected to the wide-area network and the local area network interface 1040. For example, the network services provide web pages and file downloads, etc., but it is not limited thereto.

Next, in step S604, the control unit 106 determines a plurality of service types of the network services according to a plurality of headers produced by the network services. For example, the types of the network services may include web-page browsing, point to point download, multi-point download, video stream download or voice stream download, etc., but it is not limited thereto.

Next, in step S606, the control unit 106 collects the conditions of the network services. It should be noted that, in this embodiment, the conditions of the network services includes the packet rates caused by the corresponding network services, the quality required level of the network service, the required time of the network services and/or the run time of the network service, etc., but it is not limited thereto. For example, the control unit 106 is arranged to determine the packet rates, the required times and/or the run times of the network services according to the packets caused by the network services, and is further arranged to determine the required quality levels of the network services according to the service types of the network services, but it is not limited thereto.

Next, in step S608, the control unit 106 is arranged to calculate a plurality of weightings of the corresponding network services according to the collected conditions of the corresponding network services.

Next, in step S610, the control unit 106 determines a plurality of priorities of the corresponding network services according to the weightings of the determined priorities of the corresponding network services.

Next, in step S612, the control unit 106 assigns each of the network services to the wide-area network interfaces 1020~102N according to the priority of each of the network services. It should be noted that the higher packet rates, the higher required levels, the higher required quality levels, the longer required times and the longer run times correspond to the higher priorities and weights, but it is not limited thereto.

Next, in step S614, the control unit 106 determines whether a predetermined period has elapsed. When the predetermined period has elapsed, the process goes to step S604, the control unit 106 determines the service types of the network services again according to the headers produced by the current network services to dynamically adjust the assignment of the network services.

The router and the resource assignment method of the present invention may dynamically assign the network services of the electronic device(s) to the different wide-area network interfaces according to the status and conditions of the network services. In the prior art, the router can assign the network services according to a predetermined rule or a user setting, but it cannot assign the network services according to the status and the conditions of the current network services being performed.

Resource assignment method, data transmission methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A router, comprising:
   a first wide-area network interface, arranged to connect to a first wide-area network, and connect to an Internet through the first wide-area network;
   a second wide-area network interface, arranged to connect to a second wide-area network, and connect to the Internet through the second wide-area network;
   at least one local area network interface, arranged to be electrically connected to at least one electronic device through at least one local area network; and
   a control unit, arranged to enable the electronic device to have at least one network service of the Internet through the first wide-area network interface, the second wide-area network interface and the local area network interface, and assign the at least one network service to the first wide-area network interface or the second wide-area network interface according to at least one condition of the network service of the Internet, wherein the condition comprises a packet rate caused by the network service;
   wherein the first wide-area network and the second wide-area network have different bandwidths.

2. The router as claimed in claim 1, wherein the network service is more than one, and the control unit is further arranged to determine a plurality of service types of the corresponding network services according to a plurality of headers produced by the network services.

3. The router as claimed in claim 2, wherein the control unit is further arranged to collect the conditions of the network services to calculate a plurality of weightings of the corresponding network services, and compare the weightings to determine a plurality of priorities of the corresponding network services.

4. The router as claimed in claim 3, wherein the control unit is further arranged to assign each of the network services to the first wide-area network interface or the second wide-area network interface according to the priorities of the network services.

5. The router as claimed in claim 4, wherein the transmission efficiency of the first wide-area network is higher than the second wide-area network, and the control unit is further arranged to assign at least one of the network services with higher priority than the priorities of the other network services to the first wide-area network interface.

6. The router as claimed in claim 3, wherein the control unit is further arranged to determine a plurality of required quality levels of the corresponding network services according to the service type of the corresponding network services, wherein the conditions further comprise the required quality levels.

7. The router as claimed in claim 3, wherein the control unit further arranged to determine a plurality of required times of the corresponding network services, wherein the conditions further comprise the required times.

8. The router as claimed in claim 3, wherein the control unit is further arranged to determine a plurality of run times of the corresponding network services, wherein the conditions further comprise the run times, and the run time is the elapsed time since the network service began.

9. A resource assignment method, applied to an electronic device electrically connected to a router, the resource assignment method comprising:
 determining whether a first wide-area network interface is connected to a first wide-area network and a second wide-area network interface is connected to a first wide-area network, wherein the first wide-area network and the second wide-area network have different bandwidths;
 enabling the electronic device to have a plurality of network services of the Internet through the first wide-area network interface, the second wide-area network interface and a local area network interface when the first wide-area network interface is connected to the first wide-area network and the second wide-area network interface is connected to the second wide-area network, wherein the local area network interface is arranged to be electrically connected to the electronic device;
 determining a plurality of service types of the network services according to a plurality of headers produced by the network services; and
 assigning the network services to the first wide-area network interface or the second wide-area network interface according to at least one condition of the network services, wherein the condition comprises the service types of the network services.

10. The resource assignment method as claimed in claim 9, wherein the condition further comprises at least one packet rate caused by the network service.

11. The resource assignment method as claimed in claim 10, further comprising collecting the conditions of the network services to calculate a plurality of weightings of the corresponding network services, and comparing the weightings to determine a plurality of priorities of the corresponding network services.

12. The resource assignment method as claimed in claim 11, wherein the step of assigning the network services to the first wide-area network interface or the second wide-area network interface according to the condition of the network services further comprises assigning each of the network services to the first wide-area network interface or the second wide-area network interface according to the priorities of the network services.

13. The resource assignment method as claimed in claim 12, wherein the transmission efficiency of the first wide-area network is higher than the second wide-area network, and the step of assigning the network services to the first wide-area network interface or the second wide-area network interface according to the condition of the network services further comprises assigning at least one of the network services with higher priority than the priorities of the other network services to the first wide-area network interface.

14. The resource assignment method as claimed in claim 11, further comprising determining a plurality of required quality levels of the corresponding network services according to the service type of the corresponding network services, wherein the conditions further comprise the required quality levels.

15. The resource assignment method as claimed in claim 11, further comprising determining a plurality of required times of the corresponding network services, wherein the conditions further comprise the required times.

16. The resource assignment method as claimed in claim 11, further comprising determining a plurality of run times of the corresponding network services, wherein the conditions further comprise the run times, and the run time is the elapsed time since the network service began.

* * * * *